United States Patent [19]

Bonnerot et al.

[11] Patent Number: 4,587,498
[45] Date of Patent: May 6, 1986

[54] CIRCUIT FOR RECOVERING THE CARRIER OF AN AMPLITUDE-AND-PHASE-MODULATED INPUT SIGNAL

[75] Inventors: Georges Bonnerot, Les Ulis; Michel Daout, Epinay sur Orge, both of France

[73] Assignee: Telecummunications Radioelectriques et Telephoniques T.R.T., Paris, France

[21] Appl. No.: 587,089

[22] Filed: Mar. 7, 1984

[30] Foreign Application Priority Data

Mar. 7, 1983 [FR] France ................................ 83 03688

[51] Int. Cl.⁴ .............................................. H03D 3/00
[52] U.S. Cl. .................................... 329/122; 329/112; 329/132; 375/42; 375/81
[58] Field of Search ............... 329/110, 112, 122, 132; 375/42, 81, 83, 120

[56] References Cited

U.S. PATENT DOCUMENTS 4,334,312  6/1982  Yoshida ........................... 329/122 X Primary Examiner—Eugene R. LaRoche
Assistant Examiner—Robert J. Pascal
Attorney, Agent, or Firm—Thomas A. Briody; William J. Streeter; Marianne Rich

[57] ABSTRACT

A circuit for recovering the carrier of an amplitude-and-phase-modulated input signal (in particular QAM signal) is provided with a frequency-controlled oscillator for producing the carrier, with a quadrature detector for supplying signals representing the amplitude of the input signal projected on two quadrature components P and Q of the carrier signal produced by the oscillator and for thus determining the modulation states of the input signal, and with correction means for forming a correction signal for the frequency control of the oscillator on the basis of output signals from a circuit which determines zones in the plane of the quadrature components P and Q. To provide for a satisfactory operation also in the presence of selective fading, the correction means comprises a weighting circuit connected to the zone-determining circuit for producing the correction signal in accordance with distinct weights allocated to the respective zones defined by the zone-determining circuit.

9 Claims, 7 Drawing Figures

CIRCUIT FOR RECOVERING THE CARRIER OF AN AMPLITUDE-AND-PHASE-MODULATED INPUT SIGNAL

BACKGROUND OF THE INVENTION

1. Field of the Invention

The invention relates to a circuit for recovering the carrier of an amplitude- and- phase-modulated ASK-PSK input signal (in particular QAM signal), comprising an oscillator having a frequency control for producing said carrier, a quadrature detector for supplying signals representing the amplitude of said input signal projected onto two quadrature components P and Q of the carrier signal produced by said oscillator and for thus determining the modulation states of said input signal, and correction means for forming a correction signal for said frequency control of said oscillator on the basis of output signals from a circuit which determines zones in the plane of said quadrature components P and Q.

2. Description of the Prior Art

A circuit of this kind has been described in U.S. Pat. No. 3,334,312 corresponding to French Patent Application No. 2,466,145 filed on Aug. 11, 1980. In this known circuit, the correction signal is produced with all the modulation states of the input signal considered as having the same importance which ever zone they may be in. If the input signal is transmitted by a channel subject to the phenomenon of selective fading, the position of the states relative to the components in quadrature is no longer that of the ideal points but depends on the succession of states transmitted. The uncertainty of these points is more important accordingly as the phenomenon of selective fading is more pronounced. It may even happen that the domains of uncertainty become adjacent. In that case the known circuit functions badly because the states for which the signal amplitude is weak are noise generators and entail significant errors for the correction signal.

SUMMARY OF THE INVENTION

It is an object of the present invention to provide a carrier recovery circuit of the type set forth in the preamble which gives satisfactory operation both in the presence and in the absence of selective fading.

A carrier recovery circuit to the invention is characterized in that said correction means comprise a weighting circuit receiving said output signals from said zone-determining circuit for producing said correction signal in accordance with distinct weights allocated to the respective zones defined by said zone-determining circuit.

An advantage of the invention is that by appropriately chosing the different weights in the weighting circuit it is possible to avoid the problem of false locking, which can be ascertained by inspecting the curve known as "S"-curve (on this subject reference may be made to the article by A. LECLERT and P. VANDAMME in the GLOBECOM '82 report entitled "Universal carrier recovery loop for QASK and PSK signal sets").

BRIEF DESCRIPTION OF THE DRAWING

Features of the invention will be more fully appreciated from the following description of exemplary embodiments when considered in conjunction with the accompanying drawings, in which.

DESCRIPTION OF THE PREFERRED EMBODIMENT

Figure 1:
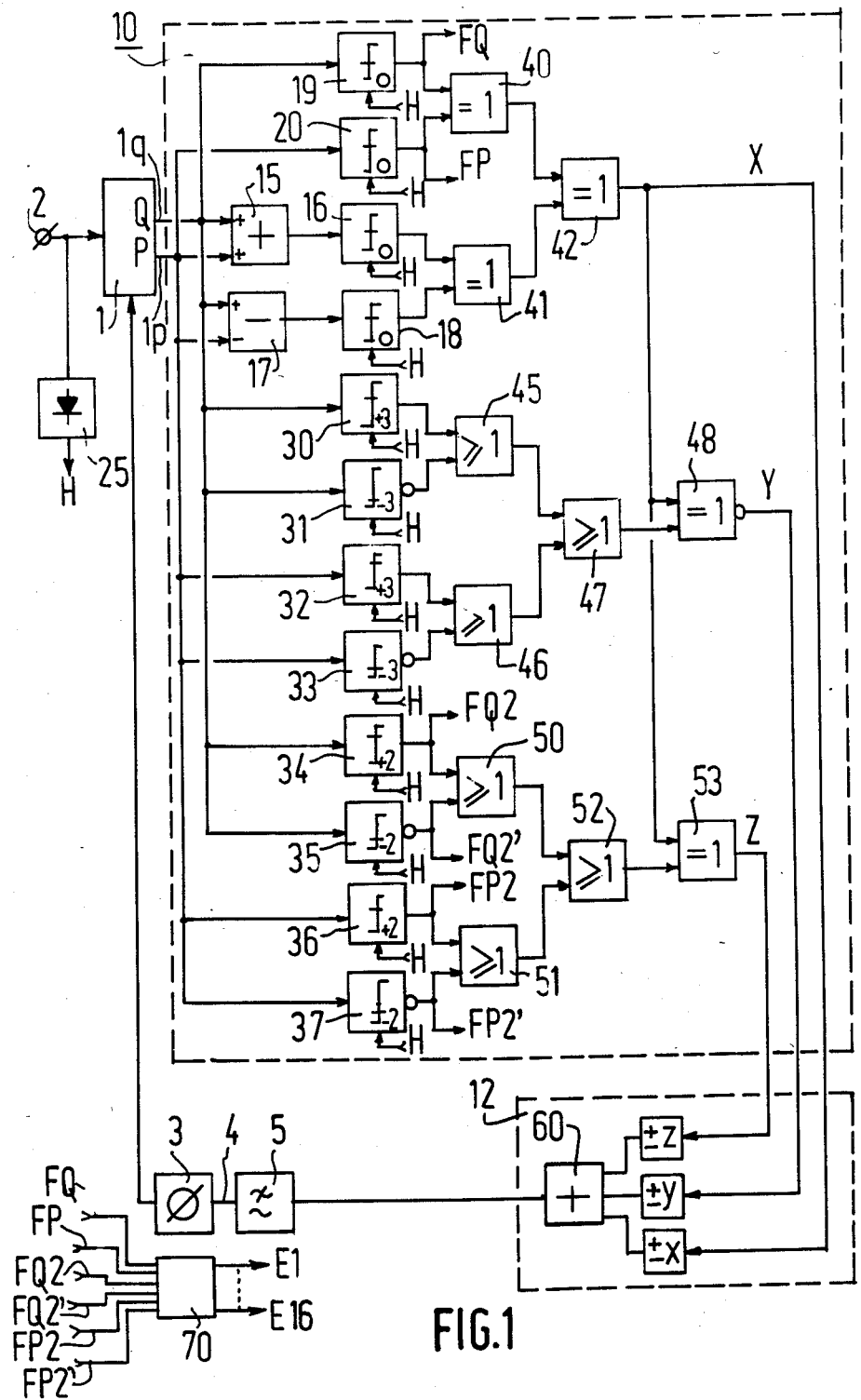
FIG. 1 shows a first embodiment of a circuit according to the invention for the recovery of the carrier of a 16 QAM signal.
Figure 2:
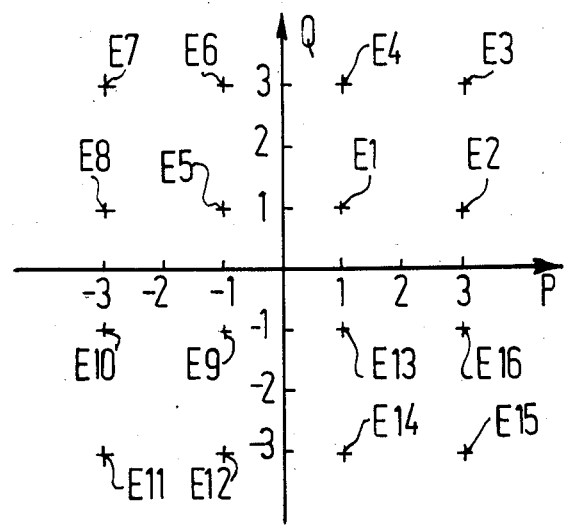
FIG. 2 shows the constellation of the modulation states in the P,Q plane for 16 QAM modulation.

In FIG. 1, where a carrier recovery circuit in accordance with the invention is shown, reference 1 indicates a quadrature detector which supplies signals on the wires 1p and 1q on the basis of which all the modulation states of an input signal applied to a terminal 2 are determined; these signals available on wires 1p and 1q are the projection of the amplitude of the input signal on the quadrature components P and Q of a carrier signal supplied by an oscillator 3 provided with a frequency control input 4. FIG. 2 shows the constellation of these modulation states when oscillator 3 is regarded as synchronized. In the example described, the input signal modulation considered is 16 QAM modulation, that is to say a modulation in 16 states; these states are indicated in FIG. 2 by E1, E2, E3, ..., E16; state E1 is characterized by signals of amplitude "1" related to the components P and Q, state E3 by signals of amplitude "3" related to the components P and Q, state E2 by signals of amplitude "3" and "1" related respectively to components P and Q, and state E4 by signals of amplitude "1" and "3" related respectively to components P and Q. States E5, E6, E7 and E8 occupy symmetric positions, in relation to component Q, to the states E1, E4, E3 and E2. States E9, E10, E11, E12, E13, E15 and E16 occupy symmetric positions, in relation to component P, to the states E5, E8, E7, E6, E1, E4, E3 and E2, respectively.

If, in particular, the oscillator is not synchronized with the input signal, the states no longer occupy the ideal positions defined above. To return these states to their ideal initial positions, means have been provided for supplying a correction signal to the frequency control input 4 of oscillator 3 via an integrating low-pass filter 5. These means comprise inter alia a circuit 10 for determining zones in the plane of the components P and Q and, in accordance with the invention, a weighting circuit 12 at the output of which the correction signal appears depending, in accordance with distinct weights, on the different zones defined by the zone-determining circuit.

The zone-determining circuit 10 comprises an adder 15 whose inputs are connected to the wires 1p and 1q and whose output is connected to a decision circuit 16, a subtractor 17 whose (+) input is connected to the wire 1q, whose (−) input is connected to the wire 1p and whose output is connected to a decision circuit 18, a decision circuit 19 whose input is connected to wire 1q and a decision circuit 20 whose input is connected to wire 1p. The circuits 16, 18, 19 and 20 supply a signal of logic value "1" when the signal at their input is greater than "0" and the logic value "0" if the signal is not. The logic values at the output appear at the rate at which the different states of the state signal appear. For this purpose provision is made, as is known, for a clock generator 25 which supplies signals H representing this rate of appearance and these signals H are applied to the different decision circuits 16, 18, 19 and 20. Other decision circuits are provided:

circuit 30, whose input is connected to wire 1q, supplies a logic signal "1" for an input signal greater than "+3", and "0" otherwise;

circuit 31, whose input is connected to wire 1q, supplies a logic signal "1" for an input signal less than "−3", and "0" otherwise;

circuit 32, whose input is connected to wire 1p, supplies a logic signal "1" for an input signal greater than "+3", "0" otherwise;

circuit 33, whose input is connected to wire 1p, supplies a logic signal "1" for an input signal less than "−3", and "0" otherwise;

circuit 34, whose input is connected to wire 1q, supplies a logic signal "1" for an input signal greater than "+2", and "0" otherwise;

circuit 35, whose input is connected to wire 1q, supplies a logic signal "1" for an input signal less than "−2", and "0" otherwise;

circuit 36, whose input is connected to wire 1p, supplies a logic signal "1" for an input signal greater than "+2", and "0" otherwise;

circuit 37, whose input is connected to wire 1p, supplies a logic signal "1" for an input signal less than "−2", and "0" otherwise.

Different logic circuits determine different zones on the basis of logic signals supplied by these decision circuits.

Figure 3:
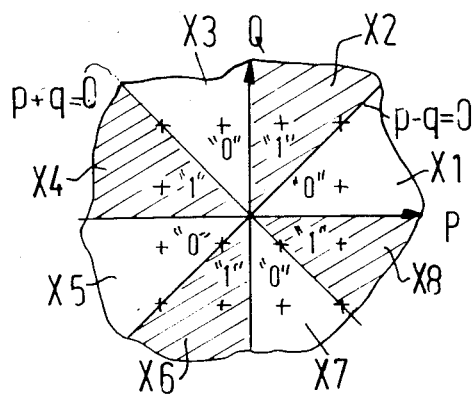
FIG. 3 shows a possible formation of the zones.
Figure 3:
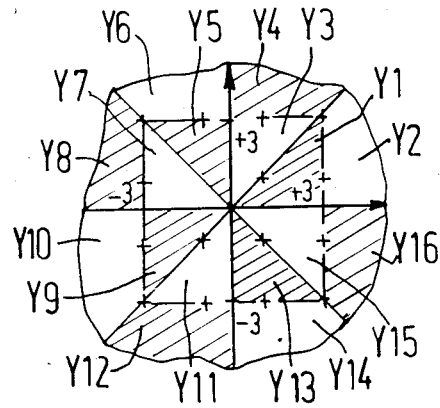
Figure 3:
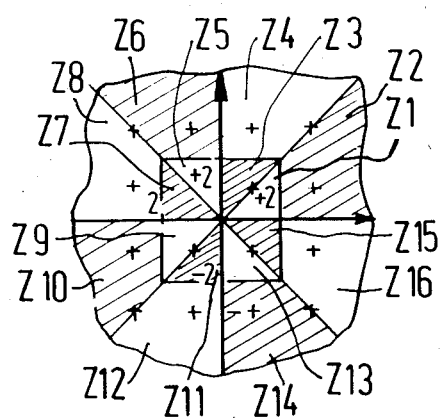
Figure 3:
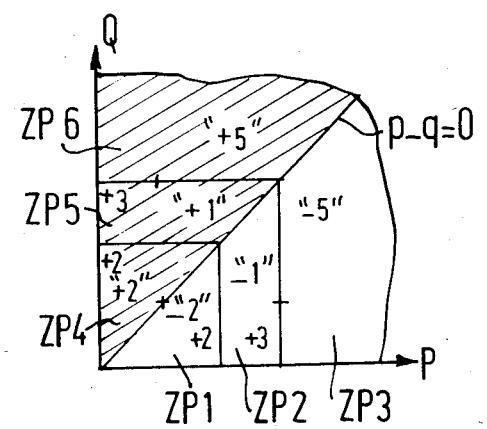

The EXCLUSIVE-OR gates 40, 41 and 42 determine zones X represented by the references X1 to X8 in diagram a of FIG. 3. Gate 42 has two inputs one of which is connected to the output of gate 40 and the other to the output of gate 41. The two inputs of gate 40 are connected to the output of the two decision circuits 19 and 20 and the two inputs of gate 41 to the output of circuits 16 and 18. The output signal of gate 42 supplies a signal of logic value "1" for the hatched zones X2, X4, X6 and X8 and a signal of logic value "0" for the other zones X1, X3, X5 and X7. These different zones are delimited on the one hand by the axes P and Q and on the other hand by the coordinates of the equations p+q=0 and p−q=0 where p is the abscissa value and q the ordinate value.

The OR gate 45, 46 and 47 and the EXCLUSIVE-OR gate 48 with inverted output cooperating with gate 42 determine zones Y represented by the references Y1 to Y16 in diagram b of FIG. 3. Gate 48 has a first input connected to the output of gate 42 and a second input connected to the output of gate 47. Gate 47 has a first input connected to the output of gate 45 and a second input connected to the output of gate 46. The two inputs of gate 45 are connected respectively to the outputs of decision circuits 30 and 31 and those of gate 46 are connected respectively to the outputs of decision circuits 32 and 33. The output signal of gate 48 supplies a signal of logic value "1" for the hatched zones Y1, Y4, Y5, Y8, Y9, Y12, Y13 and Y16 and a signal of logic value "0" for the remaining zones Y2, Y3, Y6, Y7, Y10, Y11, Y14 and Y15. In the P, Q plane these zones are delimited on the one hand by the axes P, Q and the lines p+q=0 and p−q=0 and on the other hand by a square defined by the lines p=3, p=−3, q=3 and q=−3.

The OR gates 50, 51 and 52 and the EXCLUSIVE-OR gate 53 cooperating with the gate 42 determine zones Z represented by the references Z1 to Z16 in diagram c of FIG. 3. Gate 53 has a first input connected to the output of gate 42 and a second connected to the output of gate 52. Gate 52 has a first input connected to the output of gate 50 and a second input connected to the output of gate 51. The two inputs of gate 50 are connected respectively to the outputs of decision circuits 34 and 35 and those of gate 51 are connected respectively to the outputs of decision circuits 36 and 37. The output signal of gate 53 supplies a signal of logic value "1" for the hatched zones Z2, Z3, Z6, Z7, Z10, Z11, Z14, and Z15 and a signal of logic value "0" for the remaining zones Z1, Z4, Z5, Z8, Z9, Z12, Z13 and Z16. In the P, Q plane these zones are delimited on the one hand by the axes P, Q and by the lines p+q=0, p−q=0 and on the other hand by a square defined by the lines p=2, p=−2, q=2 and q=−2.

Starting from the output signals of gates 42, 48 and 53 the weighting circuit 12 supplies a signal to the integrating low-pass filter 5 in the following manner:

to the logic values "1" of the output signals of gates 42, 48 and 53 positive values +x, +y, +z are allocated and to the values "0" the negative values −x, −y, −z are allocated;

these allocated values are then summed by an adder 60.

If the values of x, y, z are such that x=3.5, y=2 and z=0.5, then the weighting zones ZP1, ZP2, ZP3, ZP4, ZP5 and ZP6 are defined as represented in diagram d of FIG. 3, which shows only the first quadrant of the P, Q plane.

To the zone ZP1 delimited by the axis P, the line p−q=0 and the line p=2 the value "−2" is allocated. To the zone ZP2 delimited by the axis P, the line p−q=0, the line p=2 and the line p=3 the value "−1" is allocated.

To the zone ZP3 delimited by the axis P, the line p−q=0 and the line p=3 the value "−5" is allocated.

To the zones ZP4, ZP5 and ZP6 symmetrical, relative to the line p−q=0, to the zones ZP1, ZP2 and ZP3 the values "+2", "+1" and "+5" are allocated respectively.

For the other quadrants, the distribution of the zones is determined by successive rotations of the first quadrant around the point of intersection of the coordinates P and Q.

It is interesting to note that the decision circuits can be used for supplying logic signals corresponding to the different states E1 to E16. If FQ, FP, FQ2, FQ2', FP2 and FP2' designate the signals at the output of the decision circuits 19, 20, 34, 35, 36 and 37 respectively, a coding circuit 70 supplies signals representing the states E1 to E16. The coding circuit 70 performs the following logic operations.

$E3 = FQ2 \cdot FP2$ $E7 = FQ2 \cdot FP2'$ $E11 = FQ2' \cdot FP2'$ $E15 = FQ2' \cdot FP2$ $E4 = FQ2 \cdot FP \cdot \overline{E3}$ $E2 = FP2 \cdot FQ \cdot \overline{E3}$ $E1 = FP \cdot FQ \cdot \overline{E3} \cdot \overline{E2} \cdot \overline{E4}$ $E8 = FP2' \cdot FQ \cdot \overline{E7}$ $E6 = \overline{FP} \cdot FQ2 \cdot \overline{E7}$ $E5 = \overline{FP} \cdot FQ \cdot \overline{E7} \cdot \overline{E6} \cdot \overline{E8}$ $E12 = \overline{FP} \cdot FQ2' \cdot \overline{E11}$ $E10 = FP2' \cdot \overline{FQ} \cdot \overline{E11}$ $E9 = \overline{FP} \cdot \overline{FQ} \cdot \overline{E11} \cdot \overline{E10} \cdot \overline{E12}$ $E16 = FP2 \cdot \overline{FQ} \cdot \overline{E15}$ $E14 = FQ2' \cdot \overline{FQ} \cdot \overline{E15}$ $E13 = FP \cdot \overline{FQ} \cdot \overline{E15} \cdot \overline{E14} \cdot \overline{E16}$ It is evident that on the basis of the decision circuits and the logic circuits the states may be determined directly by dibits; for example, the first dibit of a state gives the number of the quandrant, which is obtained by the comparators 19 and 20, and the second dibit gives the place of the dibit in the quadrant, which is obtained by the comparators 34 and 37 and the gates 50 and 51.

Figure 4:
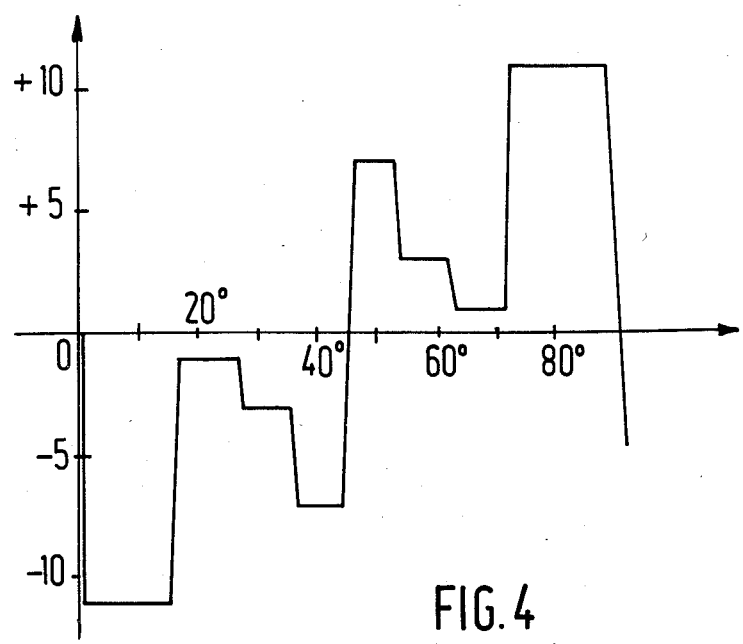
FIG. 4 shows the "S"-curve of the circuit in FIG. 1, that is to say the phase comparator characteristic presented by this circuit.

FIG. 4 shows the "S"-curve, or phase comparison characteristic, of the carrier recovery circuit in FIG. 1. The ordinates are marked in arbitrary units while angles are marked in degrees along the abscissa. It will be seen that problems of false locking are not encountered with this circuit in accordance with the invention.

Figure 5:
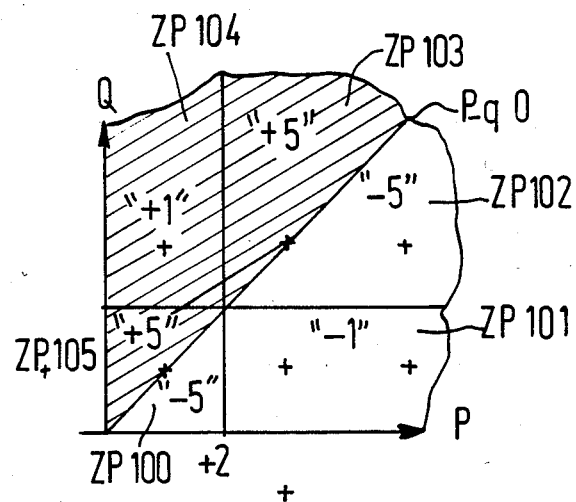
FIG. 5 shows another distribution of the zones.

Instead of the zones shown in diagram d of FIG. 3 the configuration of zones ZP100 to ZP105 indicated in FIG. 5 can be taken.

To the zone ZP100 delimited by the axis P, the line p−q=0 and the line p=2 the value "−5" is allocated. To the zone ZP101 delimited by the axis P, the line q=2 and the line p=2 the value "−1" is allocated. To the ZP102 delimited by the lines p−q=0 and the line p=2 the value "−5" is allocated.

To the zones ZP103, ZP104 and ZP105 symmetrically, relative to the line p−q=0, to the zones ZP102, ZP101 and ZP100 the values "+5", "+1" and "+5" are allocated respectively.

For the other quadrants, the distribution of the zones is derived by successive rotations of the zones of the first quadrant.

Figure 6:
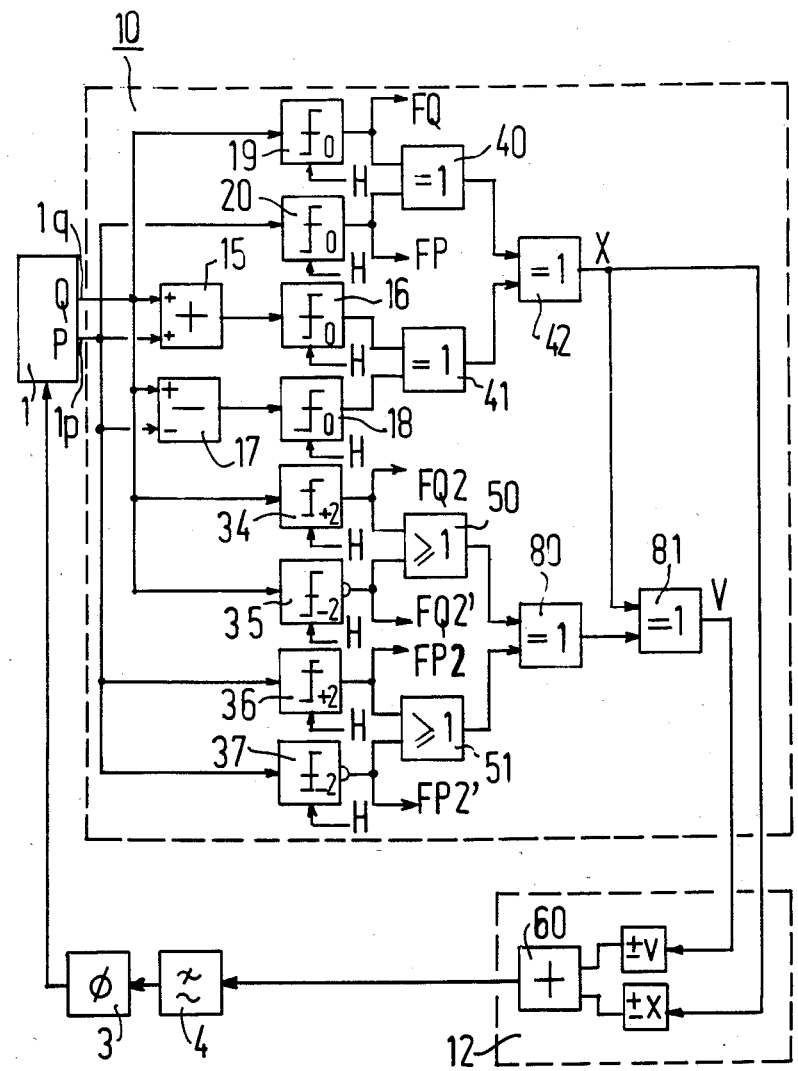
FIG. 6 shows another embodiment of a carrier recovery circuit in accordance with the invention.

The circuit shown in FIG. 6 as a variant of FIG. 1 realizes the configuration of zones in FIG. 5. The elements common to those in FIG. 1 carry the same references. This circuit is formed by a zone-determining circuit 10 comprising the elements 15, 16, 17, 18, 19, 20, 34, 35, 36, 37, 40, 41, 42, 50 and 51 already cited, and EXCLUSIVE-OR gate 80 whose inputs are connected to the outputs of gates 50 and 51 and whose output is connected to the input of another EXCLUSIVE-OR gate 81, the other input of gate 81 being connected to the output of gate 42. At the output of gate 42 a signal appears which determines the zone X already referred to, and at the output of gate 81 a signal appears which determines zones V and which, combined with those of X by means of a weighting circuit 12, makes it possible to obtain the configuration of zones shown in FIG. 5. For this purpose the weighting circuit 12 allocates the value v=2 for a signal of logic value "1" at the output of gate 81 and the value v=−2 for a signal of logic value "0", and allocates the value x=3 for a signal of logic value "1" at the output of gate 42 and the value x=−3 for a signal of logic value "0".

Figure 7:
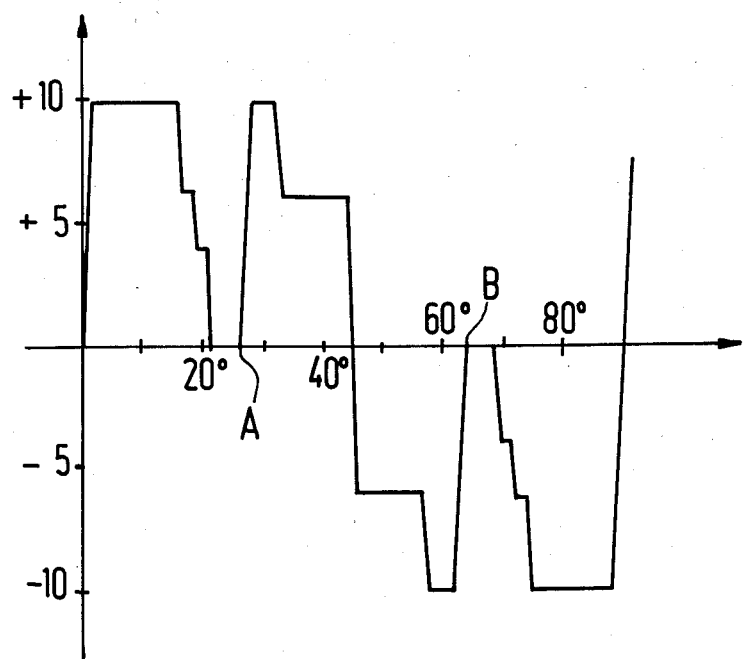
FIG. 7 shows the "S-curve of the circuit in FIG. 6.

However the "S"-curve of the circuit in FIG. 6 shown in FIG. 7 presents two ranges A and B where, theoretically, phenomena of false locking may occur. In practice, since these points are situated on the axis of the abscissa, these phenomena do not occur.

What is claimed is:

1. A circuit for recovering the carrier of an amplitude- and- phase-modulated (ASK-PSK) input signal, comprising an oscillator having a frequency control for producing said carrier, a quadrature detector for supplying signals representing the amplitude of said input signal projected on two quadrature components P and Q of the carrier signal produced by said oscillator and for thus determining the modulation states of said input signal, and correction means for forming a correction signal for said frequency control of said oscillator on the basis of output signals from a circuit which determines zones in the plane of said quadrature components P and Q, characterized in that said correction means comprises a weighting circuit receiving said output signals from said zone-determining circuit for producing said correction signal in accordance with distinct weights allocated to the respective zones defined by said zone-determining circuit.

2. A carrier recovery circuit as claimed in claim 1, arranged for a carrier modulated in 16 states (16 QAM), characterized in that said zone-determining circuit defines zones ZP1, ZP2, ZP3, ZP4, ZP5 and ZP6 in the first quadrant of the plane of said components P and Q:
   the zone ZP1 being delimited substantially by the axis P, the line p−q=0 and the line p=2,
   the zone ZP2 being delimited substantially by the axis P, the line p−q=0 and the lines p=2 and p=3,
   the zone ZP3 being delimited substantially by the axis P, the line p−q=0 and the line p=3,
   the zones ZP4, ZP5 and ZP6 being symmetrical, relative to the line p−q=0, to the zones ZP1, ZP2 and ZP3, where p and q are the abscissa and ordinate values in said P, Q plane, and the zones in the other quadrants are derived by successive rotations of 90° relative to the point of intersection of the axis P and Q of the zones of the first quadrant; and in that said weighting circuit allocates:
   a value of the order of "a" and "−a" to the zones ZP1 and P4, respectively,
   a value of the order of "b" and "−b" to the zones ZP2 and ZP5, respectively,
   a value of the order of "c" and "−c" to the zones ZP3 and ZP6, respectively,
where $|a|=2$, $|b|=1$ and $|c|=5$, the allocation for the zones of the other quadrants being derived also by said rotations.

3. A carrier recovery circuit as claimed in claim 1, arranged for a carrier modulated in 16 states (16 QAM), characterized in that said zone-determining circuit defines zones ZP100 to ZP105 in the first qudrant of the plane of said components P and Q:
   the zone ZP100 being delimited substantially by the axis P, the line p−q=0 and the line p=2,
   the zone ZP101 being delimited substantially by the axis P, the line q=2 and the line p=2,
   the zone ZP102 being delimited substantially by the line p−q=0 and the line q=2, the zones ZP103, ZP104 and ZP105 being symmetrical, relative to the line p−q=0, to the zones ZP102, ZP101 and ZP100, where p and q are the abscissa and ordinate values in said P, Q-plane, and the zones in the other quadrants are derived by successive rotations of 90° relative to the point of intersection of the axes P and Q of the zones of the first quadrant; and in that said weighting circuit allocates:
- a value of the order of "j" and "−j" to the zones ZP100 and ZP105,
- a value of the order of "k" and "−k" to the zones ZP101 and ZP104,
- a value of the order of "1" and "−1" to the zones ZP102 and ZP103, where $|j|=|1|=5$ and $|k|=1$, the allocation for the zones of the other quadrants being derived also by said rotations.

4. A carrier recover circuit as claimed in claim 1 in which said zone-determining circuit comprises decision circuits and at least a part of these decision circuits is used for determining the modulation states.

5. A carrier recovery circuit as claimed in claim 1 in which said correction means comprises logic circuits.

6. A circuit for recovering the carrier of an amplitude and phase modulated input signal modulated in 16 states, comprising an oscillator having a frequency control for producing said carrier, a quadrature detector supplying signals representing the amplitude of said input signal projected on two quadrature components P and Q of the carrier signal produced by said oscillator and for thus determining the modulation states of said input signal, and correction means for forming a correction signal for said frequency control of said oscillator on the basis of output signals from a circuit which determines zones in the plane of said quadrature components P and Q, characterized in that said correction means comprise a weighting circuit receiving said output signals from said zone-determining circuit for producing said correction signal in accordance with distinct weights allocated to the respective zones defined by said zone-determining circuit, and wherein said zone-determining circuit defines zones ZP1, ZP2, ZP3, ZP4, ZP5 and ZP6 in the first quadrant of the plane of said components P and Q:
- the zone ZP1 being delimited substantially by the axis P, the line p−q=0 and the line p=2,
- the zone ZP2 being delimited substantially by the axis P, the line p−q=0 and the lines p=2 and p=3,
- the zone ZP3 being delimited substantially by the axis P, the line p−q=0 and the line p=3,
- the zones ZP4, ZP5 and ZP6 being symmetrical, relative to the line p−q=0, to the zones ZP1, ZP2 and ZP3, where p and q are the abscissa and ordinate values in said P, Q plane, and the zones in the other quadrants are derived by successive rotations of 90° relative to the point of intersection of the axis P and Q of the zones of the first quadrant; and in that said weighting circuit allocates:
- a value of the order of "a" and "−a" to the zones ZP1 and ZP4, respectively,
- a value of the order of "b" and "−b" to the zones ZP2 and ZP5, respectively,
- a value of the oder of "c" and "−c" to the zones ZP3 and ZP6, respectively, where $|a|=2$, $|b|=1$ and $|c|=5$, the allocation for the zones of the other quadrants being derived also by said rotations.

7. A carrier recovery circuit as claimed in claim 6, arranged for a carrier modulated in 16 states (16 QAM), characterized in that said zone-determining circuit defines zones ZP100 to ZP105 in the first quadrant of the plane of said components P and Q:
- the zone ZP100 being delimited substantially by the axis P, the line p−q=0 and the line p=2,
- the zone ZP101 being delimited substantially by the axis P, the line q=2 and the line p=2,
- the zone ZP102 being delimited substantially by the line p−q=0 and the line q=2,
- the zones ZP103, ZP104 and ZP105 being symmetrical, relative to the line p−q=0, to the zones ZP102, ZP101 and ZP100, where p and q are the abscissa and ordinate values in said P, Q-plane, and the zones in the other quadrants are derived by successive rotations of 90° relative to the point of intersection of the axes P and Q of the zones of the first quadrant; and in that said weighting circuit allocates:
- a value of the order of "j" and "−j" to the zones ZP100 and ZP105,
- a value of the order of "k" and "−k" to the zones ZP101 and ZP104,
- a value of the order of "1" and "−1" to the zones ZP102 and ZP103, where $|j|=|1|=5$ and $|k|=1$, the allocation for the zones of the other quadrants being derived also by said rotations.

8. A carrier recovery circuit as claimed in claim 6, in which said zone-determining circuit comprises decision circuits and at least a part of these decision circuits is used for determining the modulation states.

9. A carrier recovery circuit as claimed in claim 6, in which said correction means comprises logic circuits.

* * * * *